United States Patent
Maynard

[11] Patent Number: 5,560,564
[45] Date of Patent: Oct. 1, 1996

[54] CORD ORGANIZER

[76] Inventor: G. David Maynard, 105 Lee Ct., River Ridge, La. 70123

[21] Appl. No.: 507,583

[22] Filed: Jul. 26, 1995

[51] Int. Cl.$^6$ ............................ B65H 75/28; B65H 75/38
[52] U.S. Cl. ..................... 242/402; 242/405.1; 242/588
[58] Field of Search ............................. 242/405.1, 402, 242/588

[56] References Cited

U.S. PATENT DOCUMENTS

| | | | |
|---|---|---|---|
| 2,420,861 | 4/1947 | Carlson | 242/588 X |
| 2,533,341 | 12/1950 | Alfano | 242/96 |
| 2,590,695 | 3/1952 | Gomberg | 242/405.1 |
| 3,416,743 | 5/1967 | Harrison et al. | 242/85.1 |
| 3,806,671 | 4/1974 | Anderson | 191/122 R |
| 3,924,819 | 12/1975 | Lapinskas | 242/85.1 |
| 3,934,838 | 1/1976 | D'Amico | 242/405.1 |
| 4,872,622 | 10/1989 | Mansfield | 242/405.1 |

Primary Examiner—John Q. Nguyen
Attorney, Agent, or Firm—Joseph N. Breaux

[57] ABSTRACT

A cord organizer for storing an excess length of an electrical power cord including a first and second bundle strap assembly, connected by a central bundle strap connecting member, and a pair of cord clips, located on the bundle strap connecting member. Each bundle strap assembly includes a slotted strap insertable within the strap aperture of a cinch mechanism. The cinch mechanism has a screw-type barrel member that includes a cinch thread formed on an outer surface thereof. The barrel member is rotatable with respect to the strap aperture in a manner such that the cinch thread engages and urges the slotted strap through the strap aperture in a first predetermined direction when the barrel member is rotated in a clockwise direction and a second predetermined direction when the barrel member is rotated in the counter-clockwise direction. When a portion of the slotted strap is secured through the strap aperture, the cinch mechanism and slotted strap formed a closed bundle aperture that is utilized to contain and secure multiple sections of the power cord.

20 Claims, 5 Drawing Sheets 5,560,564

CORD ORGANIZER

TECHNICAL FIELD

The present invention relates to devices for storing elongated, flexible cords and more particularly to devices for storing elongated, flexible cords that may be utilized with electrical power cords to secure the cord in a wound configuration with at least two user securable straps.

BACKGROUND ART

Electrical appliances are often equipment with an electrical power cord of a length greater than is required. Storing the excess length of electrical power cord in a safe, out of the way location, can be aggravating. Winding the excess cord in a coil and throwing the coil behind the appliance can be a sufficient solution in some cases, however, the cord is often pulled out by a pet or small child and left where it can pose a tripping hazard. In addition, the excess length of electrical power cord can be an attractive chew toy for pets. A pet chewing on an electrical power cord can pose a serious health hazard to the animal and a fire hazard to the residents of the house.

It would be a benefit, therefore, to have a device for storing the excess length of an electrical power cord that may be used to adjust the length of the power cord to the minimum length required to provide electrical power to an appliance. It would be a further benefit if the device had a mechanism that allowed the excess cord to be coiled in a neat fashion about a coiling body and then secured in place to prevent accidental uncoiling of the excess cord. Because of the possibility of small children unwinding the excess length of power cord, it would also be a benefit if the securing mechanism required the operation of at least two mechanisms requiring the extended manipulation of a screw-type tightening mechanism. It would be a further benefit if the device also included a gripping mechanism for gripping and holding a portion of the incoming and outgoing length of electrical power cord in a neat, esthetically pleasing fashion.

GENERAL SUMMARY DISCUSSION OF INVENTION

It is thus an object of the invention to provide a device for storing the excess length of an electrical power cord that is useful for adjusting the length of the electrical power cord to the minimum length required to provide electrical power to an appliance.

It is a further object of the invention to provide a device for storing the excess length of an electrical power cord that includes a securing mechanism for securing a length of excess power cord in a coiled configuration and preventing the accidental uncoiling of the excess cord.

It is a still further object of the invention to provide a device for storing the excess length of an electrical power cord that includes a securing mechanism that requires the operation of at least two mechanisms requiring the extended manipulation of a screw-type tightening mechanism.

It is a still further object of the invention to provide a device for storing the excess length of an electrical power cord that includes a gripping mechanism for gripping and holding the incoming and outgoing portions of the electrical power cord in a neat, esthetically pleasing fashion.

It is a still further object of the invention to provide a device for storing the excess length of an electrical power cord that accomplishes some or all of the foregoing objects in combination.

Accordingly, a cord organizer for storing an excess length of an electrical power cord is provided. The cord organizer includes a first and second bundle strap assembly, connected by a central bundle strap connecting member, and a pair of cord clips, located on the bundle strap connecting member. Each bundle strap assembly includes a slotted strap insertable within the strap aperture of a cinch mechanism. The cinch mechanism has a screw-type barrel member that includes a cinch thread formed on an outer surface thereof. The barrel member is rotatable with respect to the strap aperture in a manner such that the cinch thread engages and urges the slotted strap through the strap aperture in a first predetermined direction when the barrel member is rotated in a clockwise direction and a second predetermined direction when the barrel member is rotated in the counter-clockwise direction. When a portion of the slotted strap is secured through the strap aperture, the cinch mechanism and slotted strap formed a closed bundle aperture that is utilized to contain and secure multiple sections of the power cord. Use of the slotted strap in combination with the screw-type cinch mechanism allows the diameter of the bundle aperture to be adjusted by the user to snugly secure various sized cable bundles that may be formed.

The cord clips have a gripping aperture formed between two arcuate, resilient members that are oriented in a manner to form an insertion slot through which a portion of the power cord may be laterally inserted. The insertion slots are preferably oriented in parallel with the longitudinal axis of at least one of the bundle apertures.

The barrel member preferably includes a gripping portion extending from one end of the barrel member that includes a flattened portion for gripping between the thumb and finger of a user. The entire cord organizer is preferably constructed from a non-conducting material such as plastic or nylon.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
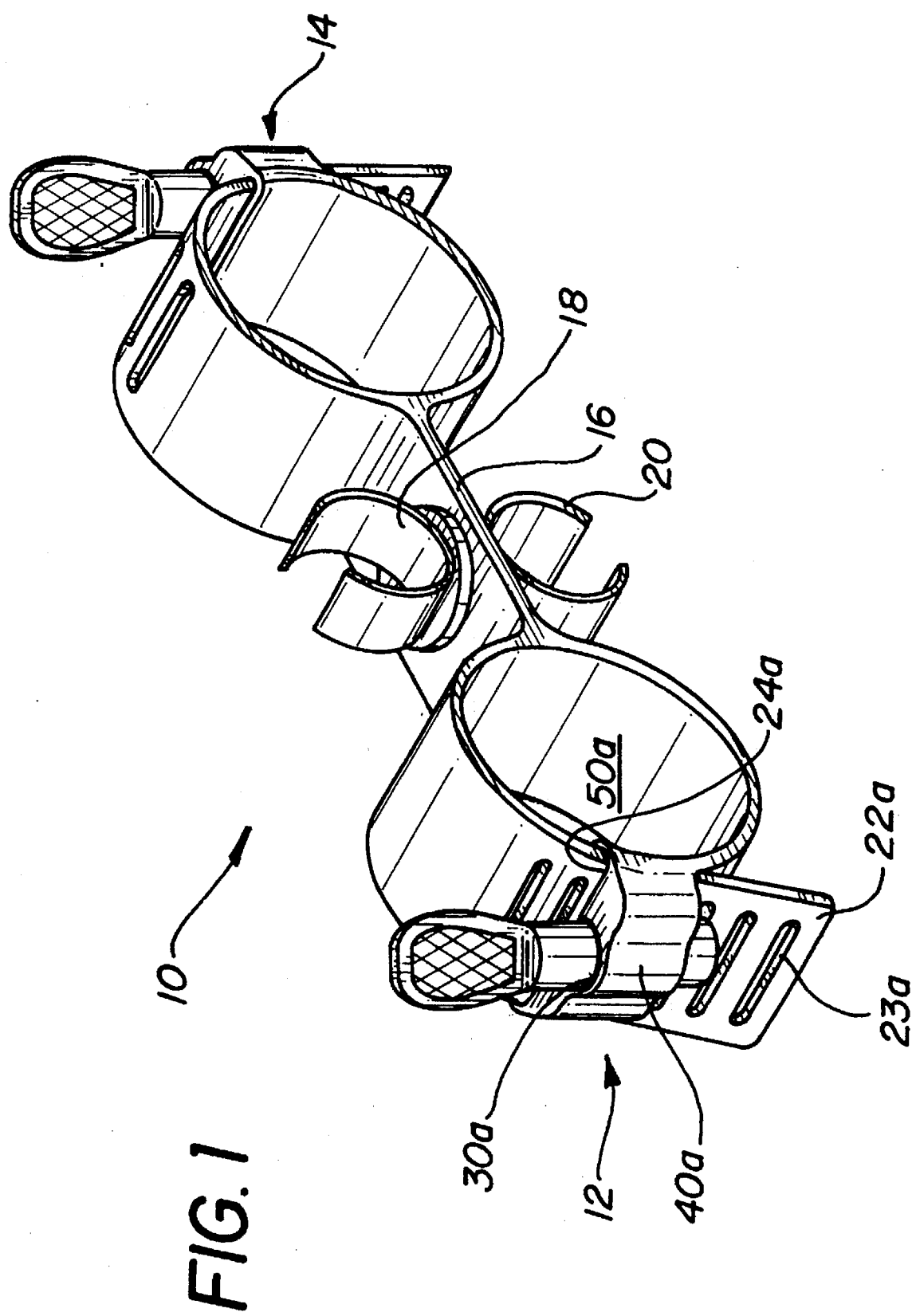
FIG. 1 is a perspective view of an exemplary embodiment of the cord organizer of the present invention in isolation showing the first and second bundle strap assemblies in the tightened configuration and the first and second cord clips in a preferred parallel orientation.

FIG. 1 shows and exemplary embodiment of the cord organizer of the present invention generally designated by the numeral 10. Cord organizer 10 is constructed from a resilient plastic and includes a first bundle strap assembly, generally designated by the numeral 12; a second bundle strap assembly, generally designated the numeral 14; a central bundle strap connecting member 16; a first cord clip 18; and a second cord clip 20.

Figure 2:
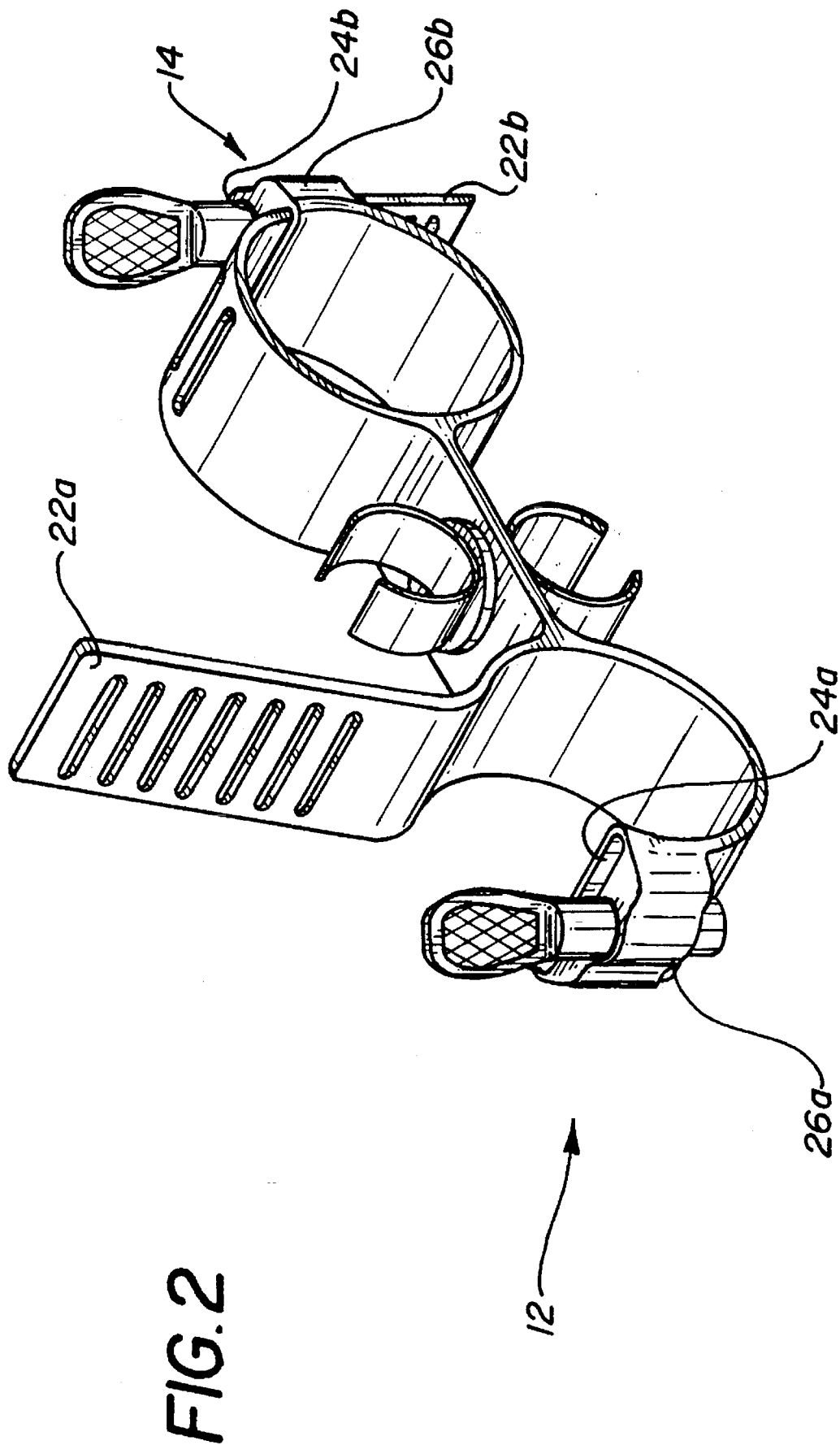
FIG. 2 is a perspective view of the cord organizer of FIG. 1 showing the slotted securing strap of the first bundle strap assembly removed from the strap aperture of the cinch mechanism.
Figure 3:
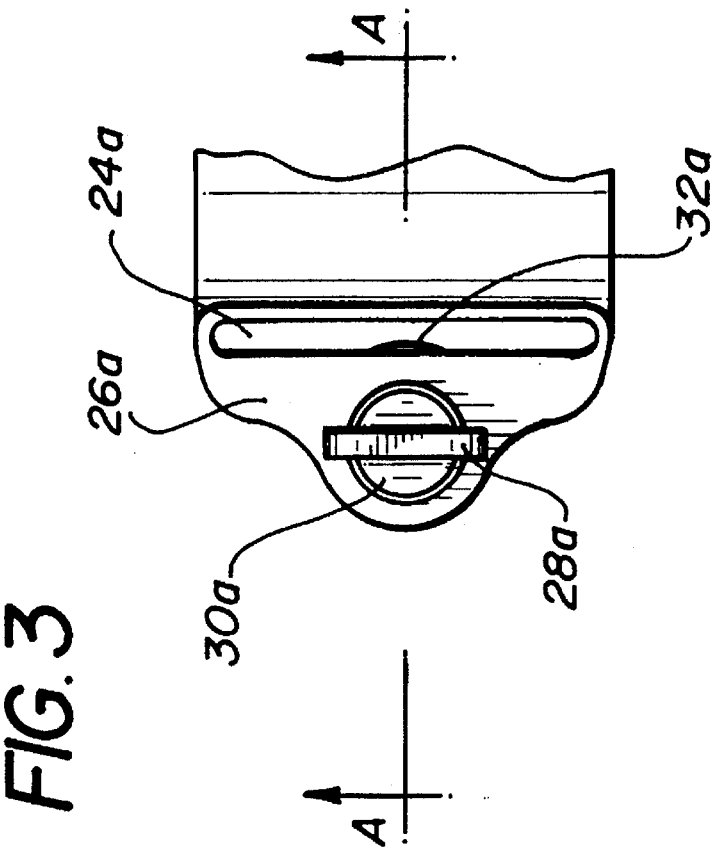
FIG. 3 is a detail, top view of the cinch mechanism shown in FIG. 2 showing a portion of the strap engagement thread of the rotatable cinch knob.

With reference to FIG. 2, each bundle strap assembly 12, 14 includes a flexible, slotted strap 22a, 22b insertable within a strap aperture 24a, 24b of a cinch mechanism 26a, 26b. (Although the following discussion is made with specific reference to bundle strap assembly 12 and elements thereof, all references are equally applicable to bundle strap assembly 14 which is identical to bundle strap assembly 12.) FIG. 3 is a top detail view of cinch mechanism 26a showing the top of the gripping portion 28a which is secured to a rotatable barrel member 30a. As shown in the figure, barrel member 30a includes a set of cinch threads 32a that extend into strap aperture 24a.

Figure 4:
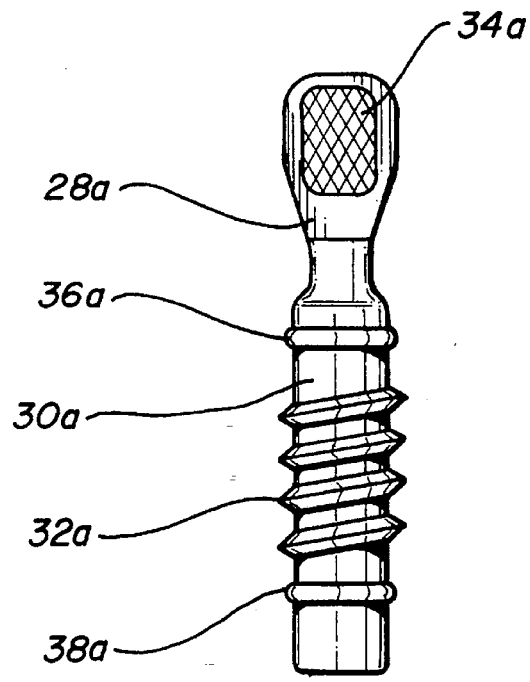
FIG. 4 is a side view of the cinch knob showing the central barrel member, the cinch threads, the first and second rotation flanges, and the grip portion.

FIG. 4 is a side view of gripping portion 28a and barrel member 30a in isolation. Gripping portion 28a includes a flattened, knurled portion 34a to enhance gripping of gripping portion 28a between the thumb and finger of a user. Barrel member 30a is substantially cylindrical in shape and includes an upper and lower rotation flange 36a, 38a located on the exterior thereof. As mentioned herein before, barrel member 30a also includes a set of cinch threads 32a.

Figure 5:
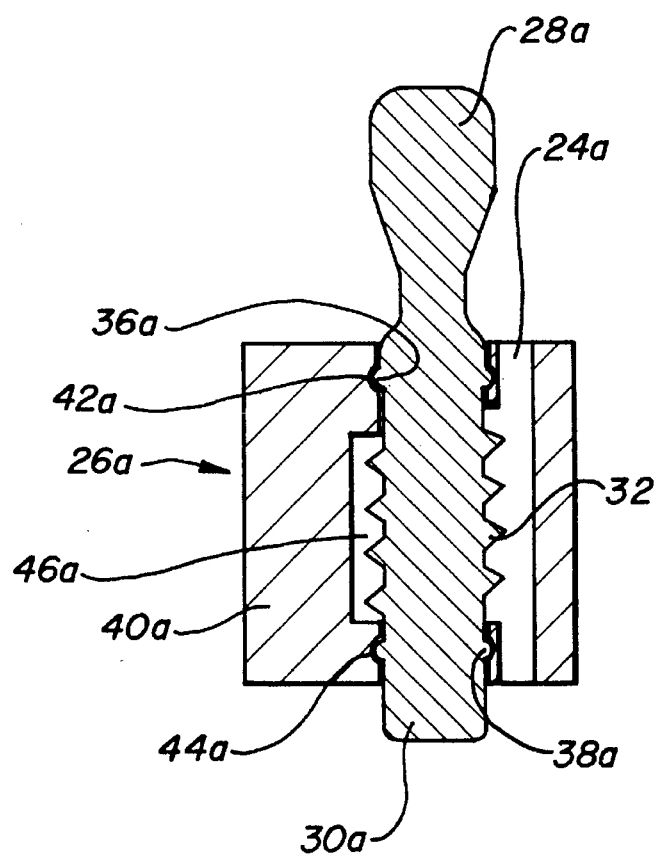
FIG. 5 is a cross-sectional, side view of a cinch mechanism showing the cinch mechanism body, the gripping portion, the barrel member, the upper rotation flange, the lower rotation flange, and the cinch thread.

FIG. 5 is a cross-sectional detail view of cinch mechanism 26a showing cinch mechanism body 40a, gripping portion 28a, barrel member 30a, upper rotation flange 36a, lower rotation flange 38a, and cinch thread 32a. Cinch mechanism body 40a, has an upper flange channel 42a, a lower flange channel 44a, a cinch thread channel 46a, and strap aperture 24a. Upper and lower flange channels 42a, 44a are sized to receive upper and lower flanges 36a,38a, respectively, in a manner such that barrel member 30a rotates within cinch mechanism body 40a. With reference once again to FIG. 1, when slotted strap 22a is disposed within strap aperture 24a and barrel member 30a rotates, cinch threads 32a (shown in FIG. 3) engage slots 23a and force slotted strap 22a in a predetermined direction with respect to cinch mechanism housing 40a. As slotted strap 22a changes position within strap aperture 24a the diameter of bundle aperture 50a increases or decreases.

Figure 7:
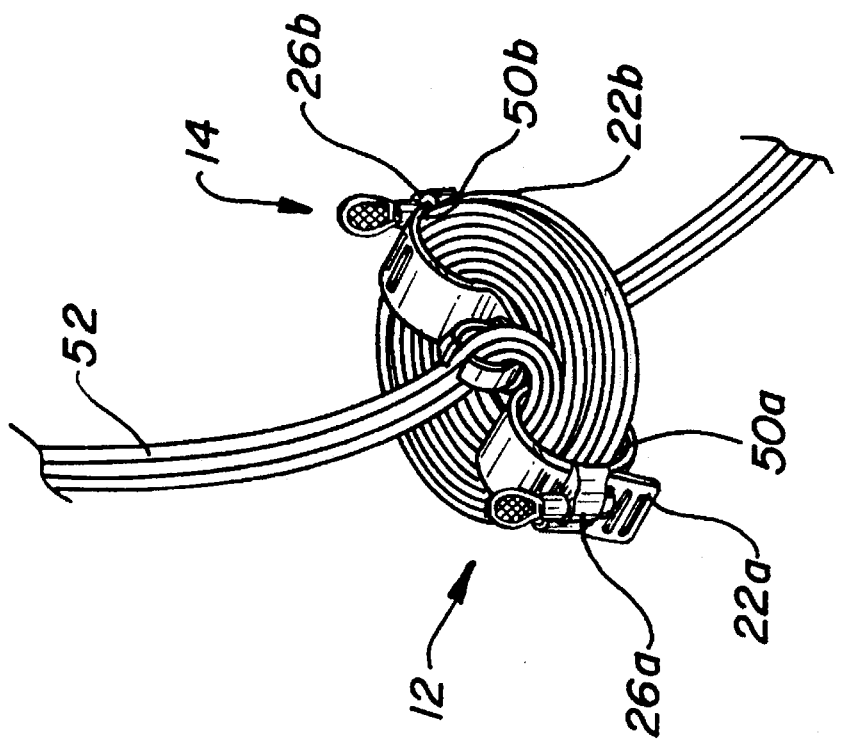
FIG. 7 is a second perspective view of the cord organizer of FIG. 1 showing a representative power cord fully wound in the winding configuration of FIG. 6 with the first and second slotted straps each cinched down around a bundle of lengths of the representative power cord.
Figure 6:
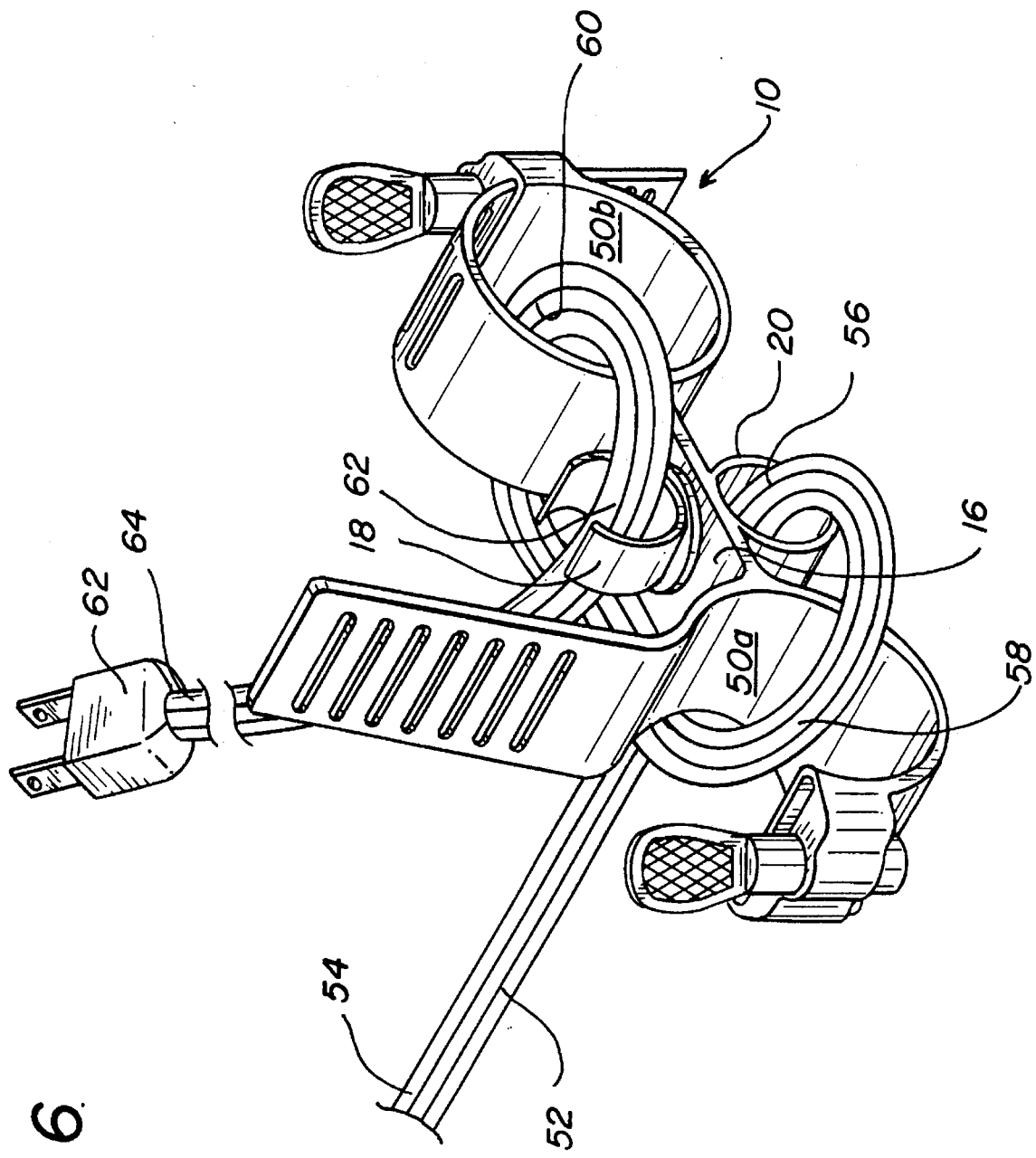
FIG. 6 is a perspective view of the cord organizer of FIG. 1 showing a representative power cord threaded once through the bundle apertures and secured by the first and second cord clips to illustrate an exemplary winding configuration.

FIG. 6 is a perspective view of cord organizer 10 in use with a representative electrical power cord 52. For the purpose of clearly illustrating an exemplary winding configuration power cord 50 is only disposed through bundle apertures 50a, 50b a single time. Power cord 52 is connected at one end 54 to an appliance (not shown). Traveling from end 54, a first section 54 of power cord 52 is disposed within cord clip 20. Power cord 52 then executes about a one-hundred-eighty (180°) degree turn, a section 58 passes through bundle aperture 50a. From there, power cord 52 travels parallel to bundle strap connecting member 16, executes about a ninety (90°) degree turn, and a section 60 passes through bundle aperture 50b. Power cord 52 then executes about a one-hundredeighty (180°) degree turn, and a section 62 passes through cord clip 18. Power cord 52 then continues on toward a plug 64 located at an end 64 of power cord 52. Multiple sections of power cord 52 may be passed through bundle apertures 50a, 50b. The number of passes through bundle apertures 50a, 50b is determined according to the length of excess cord 52 desired to be stored. The greater the length of power cord 52 to be stored on organizer 10 the greater the number of passes through bundle apertures 50a, 50b that must be accomplished. FIG. 7 shows power cord 52 having multiple passes through bundle apertures 50a, 50b. In this figure, cinch mechanism 26a,26b have been utilized to tighten slotted straps 22a, 22b until each bundle strap assembly 12, 14 is secured about a bundle of power cord sections.

It can be seen from the preceding description that a cord organizer has been provided that is useful for adjusting the length of the electrical power cord to the minimum length required to provide electrical power to an appliance; that includes a securing mechanism for securing a length of excess power cord in a coiled configuration and preventing the accidental uncoiling of the excess cord; that includes a securing mechanism that requires the operation of at least two mechanisms requiring the extended manipulation of a screw-type tightening mechanism; and that includes a gripping mechanism for gripping and holding the incoming and outgoing portions of the electrical power cord in a neat, esthetically pleasing fashion.

It is noted that the embodiment of the cord organizer described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cord organizer comprising:

a first bundle strap assembly including a first slotted strap and first cinch mechanism having a first strap aperture of a size sufficient to allow insertion therein of said first slotted strap for cinching said strap therein in a manner to form a first bundle aperture;

a second bundle strap assembly including a second slotted strap and a second cinch mechanism having a second strap aperture of a size sufficient to allow insertion therein of said second slotted strap for cinching said strap therein in a manner to form a second bundle aperture;

a bundle strap connecting member in connection between and with said first and second bundle strap assemblies;

a first cord clip positioned on the connecting member and having a pair of resilient members that are oriented in a manner to form a first insertion slot, in connection with a first cord gripping aperture, through which a portion of said power cord may be laterally inserted; and a second cord clip positioned on the connecting member and having a pair of resilient members that are oriented in a manner to form a second insertion slot, in connection with a second cord gripping aperture, through which a portion of said power cord may be laterally inserted.

2. The cord organizer of claim 1, wherein:

said first slotted strap at least partially forms a first bundle aperture having a first longitudinal axis;

said second slotted strap at least partially forms a second bundle aperture having a second longitudinal axis; and said first longitudinal axis is oriented in parallel with said second longitudinal axis.

3. The cord organizer of claim 2 wherein:

said insertion slots are preferably oriented in parallel with said longitudinal axis of at least one of said first and second bundle apertures.

4. The cord organizer of claim 1, wherein:

each said cinch mechanism includes a screw-type barrel member that includes a cinch thread formed on an outer surface thereof, said barrel member being rotatable with respect to said strap aperture in a manner such that said cinch thread engages and urges said slotted strap through said strap aperture in a first predetermined direction when said barrel member is rotated in a clockwise direction.

5. The cord organizer of claim 4 wherein:

each said cinch mechanism includes a gripping portion secured to a rotatable barrel member having a set of cinch threads that extend into said strap aperture.

6. The cord organizer of claim 5 wherein:

said gripping portion includes a flattened, knurled portion.

7. The cord organizer of claim 4 wherein:

each said barrel member is substantially cylindrical in shape and includes an upper and a lower rotation flange located on an exterior surface of said barrel member.

8. The cord organizer of claim 7, wherein:

each said cinch mechanism includes a cinch mechanism body including an upper flange channel, a lower flange channel, and said strap aperture, said upper and lower flange channels are sized to receive said upper and lower flanges, respectively, in a manner such that said barrel member rotates within said cinch mechanism body.

9. The cord organizer of claim 8, wherein:

said first slotted strap at least partially forms a first bundle aperture having a first longitudinal axis;

said second slotted strap at least partially forms a second bundle aperture having a second longitudinal axis; and said first longitudinal axis is oriented in parallel with said second longitudinal axis.

10. The cord organizer of claim 9 wherein:

insertion slots are preferably oriented in parallel with said longitudinal axis of at least one of said first and second bundle apertures.

11. The cord organizer of claim 10 wherein:

each said cinch mechanism includes a gripping portion secured to a rotatable barrel member having a set of cinch threads that extend into said strap aperture.

12. The cord organizer of claim 11 wherein:

said gripping portion includes a flattened, knurled portion.

13. The cord organizer of claim 4, wherein:

each said cinch mechanism includes a cinch mechanism body including an upper flange channel, a lower flange channel, and said strap aperture, said upper and lower flange channels are sized to receive said upper and lower flanges, respectively, in a manner such that said barrel member rotates within said cinch mechanism body.

14. The cord organizer of claim 4, wherein:

said first slotted strap at least partially forms a first bundle aperture having a first longitudinal axis;

said second slotted strap at least partially forms a second bundle aperture having a second longitudinal axis; and said first longitudinal axis is oriented in parallel with said second longitudinal axis.

15. The cord organizer of claim 14 wherein:

said insertion slots are preferably oriented in parallel with said longitudinal axis of at least one of said first and second bundle apertures.

16. The cord organizer of claim 15 wherein:

each said cinch mechanism includes a gripping portion secured to a rotatable barrel member having a set of cinch threads that extend into said strap aperture.

17. The cord organizer of claim 16 wherein:

said gripping portion includes a flatten, knurled portion.

18. The cord organizer of claim 14 wherein:

each said cinch mechanism includes a gripping portion secured to a rotatable barrel member having a set of cinch threads that extend into said strap aperture.

19. The cord organizer of claim 18 wherein:

said gripping portion includes a flattened, knurled portion.

20. The cord organizer of claim 19 wherein:

said insertion slots are preferably oriented in parallel with said longitudinal axis of at least one of said first and second bundle apertures.

* * * * *